(12) United States Patent
Caldichoury

(10) Patent No.: US 12,140,376 B2
(45) Date of Patent: Nov. 12, 2024

(54) METHOD FOR VENTILATING AN OVEN

(71) Applicant: SAINT-GOBAIN ISOVER, Courbevoie (FR)

(72) Inventor: Kattalin Caldichoury, Aubervilliers (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 137 days.

(21) Appl. No.: 18/012,901

(22) PCT Filed: Jul. 19, 2021

(86) PCT No.: PCT/FR2021/051349
§ 371 (c)(1),
(2) Date: Dec. 23, 2022

(87) PCT Pub. No.: WO2022/018374
PCT Pub. Date: Jan. 27, 2022

(65) Prior Publication Data
US 2023/0258406 A1    Aug. 17, 2023

(30) Foreign Application Priority Data

Jul. 20, 2020 (FR) ...................................... 2007570

(51) Int. Cl.
| | |
|---|---|
| *F27B 9/28* | (2006.01) |
| *D04H 1/4209* | (2012.01) |
| *D04H 1/58* | (2012.01) |
| *D04H 1/732* | (2012.01) |
| *F27B 9/30* | (2006.01) |
| *F27D 19/00* | (2006.01) |
| *F27B 9/02* | (2006.01) |

(52) U.S. Cl.
CPC ......... *F27B 9/3005* (2013.01); *D04H 1/4209* (2013.01); *D04H 1/58* (2013.01); *D04H 1/732* (2013.01); *F27D 19/00* (2013.01); *F27B 9/028* (2013.01); *F27D 2019/0003* (2013.01)

(58) Field of Classification Search
CPC ... C21D 9/54; C21D 9/56; F27B 9/243; F27B 9/28; F27B 9/028; F27B 9/029
See application file for complete search history.

(56) References Cited

U.S. PATENT DOCUMENTS

| | | | |
|---|---|---|---|
| 11,774,174 B2 * | 10/2023 | Austen ................... | G06F 1/206 432/37 |
| 2018/0113482 A1 | 4/2018 | Vitullo | |
| 2023/0137733 A1 * | 5/2023 | Tsukahara .............. | H05B 6/705 |

FOREIGN PATENT DOCUMENTS

| | | | | |
|---|---|---|---|---|
| EP | 2278244 A1 * | 1/2011 | .............. | F27B 9/028 |
| EP | 3 434 991 A1 | 1/2019 | | |
| FR | 2 918 365 A1 | 1/2009 | | |

OTHER PUBLICATIONS

International Search Report as issued in International Patent Application No. PCT/FR2021/051349, dated Oct. 19, 2021.

* cited by examiner

*Primary Examiner* — Gregory A Wilson
(74) *Attorney, Agent, or Firm* — Pillsbury Winthrop Shaw Pittman LLP

(57) ABSTRACT

A method for ventilating an oven configured to cure a binder bonding mineral fibers placed on a conveyor, the oven including, in series on the path of the conveyor, an inlet, a plurality of heating chambers and an outlet, the method including a procedure in which a predictive model for estimating an amount of pollutants is used.

13 Claims, 2 Drawing Sheets

[Fig.1]
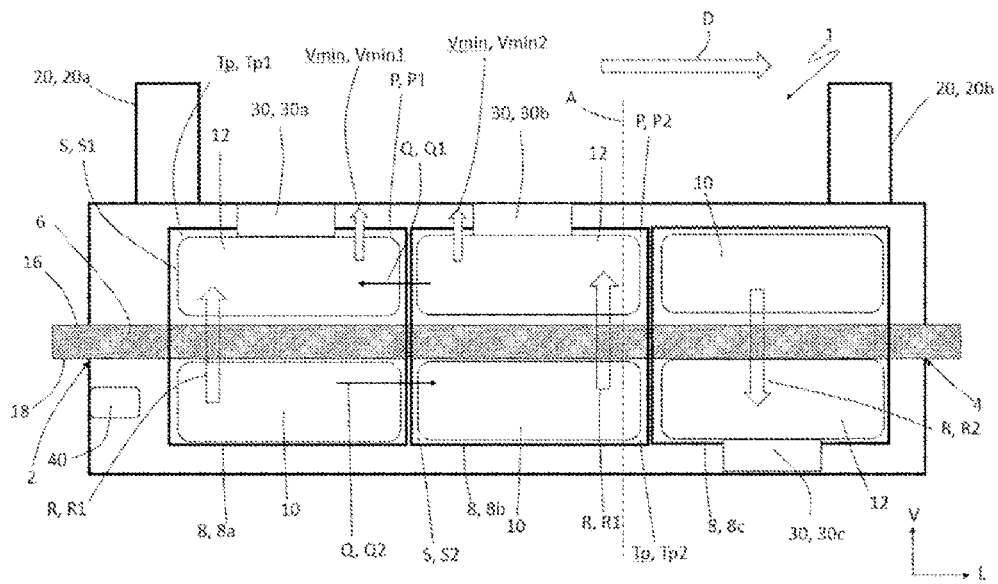
[Fig.2]
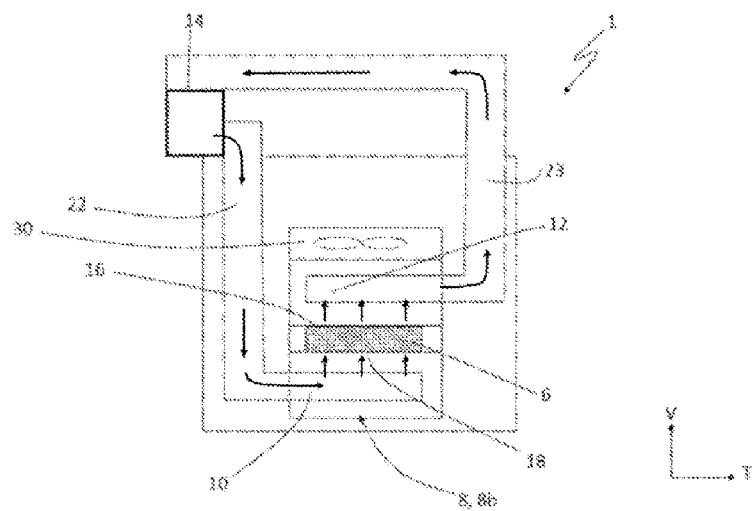

[Fig.3]
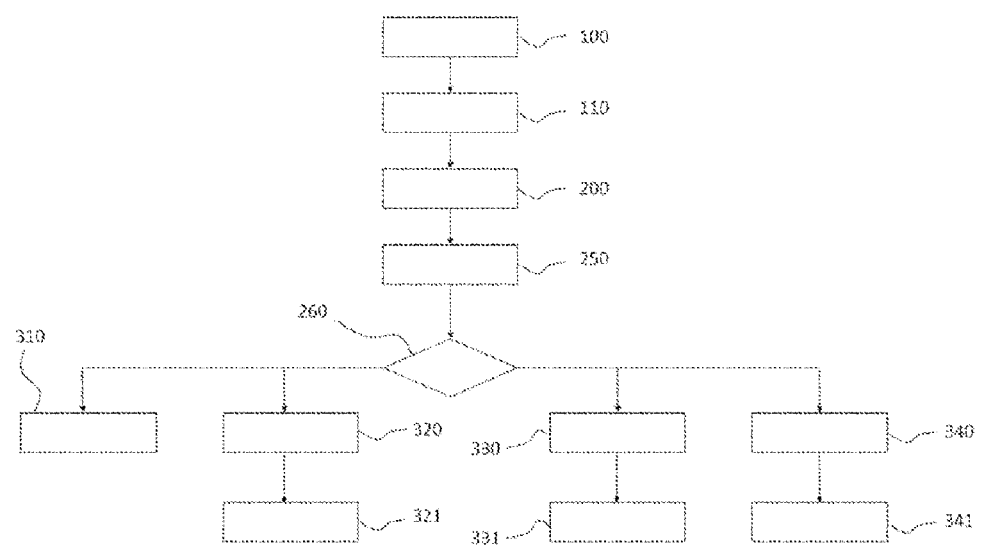

METHOD FOR VENTILATING AN OVEN

CROSS-REFERENCE TO RELATED APPLICATIONS

This application is the U.S. National Stage of PCT/FR2021/051349, filed Jul. 19, 2021, which in turn claims priority to French patent application number 2007570 filed Jul. 20, 2020. The content of these applications are incorporated herein by reference in their entireties.

The present invention relates to a method for ventilating a mineral fiber treatment oven.

The ovens used in the manufacture of insulating materials with mineral fibers make it possible to heat the mineral fibers obtained beforehand in a fiberizing station, these mineral fibers arriving in the oven embedded in a binder, and the heat generated in the oven makes it possible to form a layer of mineral fiber insulating material at the outlet of the oven.

Such an oven comprises for this purpose at least one conveyor, on which the mineral fibers and the binder are placed at the inlet, and a succession of heating chambers arranged in series and that the conveyor passes successively through each chamber comprising two modules arranged on either side of the conveyor. Different types of heating may be implemented within such an oven, including electrical, infrared or microwave heating.

Each chamber can in particular comprise at least one blowing module and a suction module, respectively. The blowing module in particular comprises a gas burner, the flue gases of which circulate through the blowing module to the heating chamber. The suction module is configured to collect the flue gas present in the corresponding chamber in order to redistribute a part thereof in the burner. Also, the oven comprises at least one chimney making it possible to evacuate some of the flue gases resulting from the combustion of material in the burners, in particular by suction.

In such chambers, and regardless of the type of heating, chamber venting is necessary in order to limit the risks of explosion due to flammable materials that escape during firing. Such a ventilation is contingent on the temperature said oven reaches, or can reach, while in operation, and possibly on the types of materials that circulate within the oven, and on an amount of pollutants that result from the firing of said material.

Although it is easy to measure the temperature within the oven, and to adapt, if appropriate, that oven's ventilation as a function of the measured temperature, it may be more complex to quantify the amount of pollutants resulting from the firing of the material. In order to be sure to ventilate sufficiently the oven in order to avoid an explosion, it is therefore known to oversize the ventilation of the oven in each of these zones, that is from the inlet to the outlet of the conveyor, in each of the heating chambers that the conveyor passes through.

The invention falls within this context and aims to improve existing chambers, in particular aimed at optimizing the ventilation of the chambers by appropriate ventilation in each of the chambers of the oven. The invention allows this optimization of ventilation in particular by establishing and considering a predictive model of estimation of the quantities of pollutants to be extracted from each of the chambers of the oven independently, depending on various parameters of the oven, in order to adjust the ventilation of the oven to the actual needs of each of the chambers. In this way, the costs associated with the general operation of the oven are reduced while limiting the risks of explosion of the oven.

The invention therefore proposes a method for ventilating an oven configured to form a mat of mineral fibers by firing a binder bonded with a mineral material placed on a conveyor, the oven comprising, in series on the path of the conveyor, an inlet, a plurality of heating chambers and an outlet, the ventilation method comprising at least the implementation, by a control unit of the oven, of a plurality of successive steps that include:

- a first step of computing, chamber by chamber or set of chambers by set of chambers, an amount of pollutants present in at least two chambers or two sets of chambers of the oven, said first step implementing a comparison of the features of the current operation of the oven with a predictive model defined upstream and implemented in the control unit of the oven,
- a second step of computing a minimum ventilation flow rate for the discharge of the amount of pollutants in each of the two chambers or of the two sets of chambers,
- a third step of generating an independent control instruction intended for each of the chambers, or of each of the sets of chambers, for specific ventilation of each chamber or of each set of chambers as a function of the minimum ventilation flow rate calculated previously specifically for each of the chambers or set of chambers.

The first step of computing, chamber by chamber or set of chambers by set of chambers, the amount of pollutants is based on a predictive model which uses data such as the type of binder used, the configuration and operating parameters of the oven, in particular its temperature, in order to determine the loss of mass of the binder and then the amount of pollutants associated with this loss of mass. In other words, the predictive model makes it possible to estimate within a specific chamber, or to a set of specific chambers, the amount of pollutants released from the binder bonding the mineral material during its firing, and this independently in each of the chambers of the oven or sets of chambers of the oven. The predictive model can in particular consist of a database obtained prior to the operation of the oven and applicable in real time during the operation of the oven in order to precisely determine the amount of pollutants emitted by the firing of the binder bonding the mineral material during this operation of the oven. The data of the predictive model are in particular integrated into the control unit of the oven.

It is understood that the predictive model is used during the first step in order to determine the amount of pollutants in at least two chambers or two sets of chambers, the amount of pollutants being able to vary from one chamber to the other or from one set of chambers to another depending on the operating parameters of the oven and the reaction of the binder bonding the mineral material in each of the chambers or sets of chambers according to these parameters. A plurality of chambers arranged successively along the conveyor is defined in particular by a set of chambers. Advantageously, the amount of pollutants in each of the chambers or sets of chambers that the oven comprises is determined.

The second step makes it possible to compute the minimum ventilation flow rate which is necessary to evacuate the amount of pollutants in each of the chambers or set of chambers, as determined during the first step. This second computing step is performed by taking into consideration a lower explosive limit. The lower explosive limit (or LEL for short) is defined as the maximum value beyond which an amount of pollutants in one of the chambers or one of the sets of chambers can generate an explosion. More precisely, the lower explosive limit corresponds to a concentration, in $g/m^3$, maximum pollutants that may be present in a chamber or set of chambers, before this concentration is generating an explosion within the oven. This lower explosive limit may in particular be determined for a given temperature and more precisely for a given temperature range.

The third step of the method takes into account the minimum ventilation flow rate for the discharge of the pollutants from each of the chambers or of each of the sets of chambers in order to apply a control instruction specific to each of the chambers or sets of chambers. It is then understood that one of the advantages of the method is in particular that it makes it possible on the one hand to determine the amount of pollutants that is present in each of the chambers independently of the other chambers, and that it makes it possible on the other hand to apply a specific control instruction independently in each of the chambers. It is therefore understood that each of the chambers that the oven comprises is able to apply, in response to a specific control instruction that differs from one chamber to another, specific ventilation sized to evacuate an amount of pollutants that is specific to this chamber. The specific control instruction can be, for example, and in a non-limiting way, an increase in the extraction power of the pollutants by means of the chimneys or the starting of an additional ventilation unit.

The aim of the invention is therefore to obtain adequate ventilation, and to ensure a minimum ventilation flow rate, in each of the chambers so that the concentration of the pollutants does not exceed the lower explosive limit as a function of the temperature of each of the chambers. This method takes advantage of this method in that it allows reliability in predicting of the amount of pollutants in each of the chambers, and therefore the implementation of appropriate and effective ventilation in order to avoid explosions within the oven, without requiring a real-time measurement thereof.

According to an optional feature of the invention, the ventilation method comprises at least one step of constructing the predictive model implemented in the control unit. As has been mentioned, the construction of the predictive model makes it possible to configure the unit for controlling the oven with data specific to said oven and to the mineral material which is fired in this oven. Without departing from the context of the invention, the predictive model can be carried out on site, before the first implementation of the oven or at the end of a certain operating time in order to update the predictive model with the possible wear of the oven, or else it may be carried out remotely, for example in a laboratory, under conditions representative of the operation of the oven.

According to an optional feature of the invention, during the step of constructing the predictive model, at least one loss of mass of the mineral material is determined as a function of a firing temperature. In order to determine this loss of mass, it is in particular possible to carry out tests under real conditions, that is by firing, at a given firing temperature, a binder sample bonding a mineral material in a furnace reproducing the operating parameters of the oven on which the predictive model is to be implemented, and weighing this sample prior to the firing step and subsequently to this firing step. The production of a plurality of tests, under different firing conditions and for different types of mineral and binder material, thus makes it possible to establish a database that reflects the losses of mass of a type of binder bonding a type of mineral material, as a function of the firing temperature. It should be considered that the firing temperature here is a temperature that can be kept substantially constant inside the furnace throughout the test, this firing temperature representing the temperature as desired in the oven during the operation thereof According to an optional feature of the invention, during the step of constructing the predictive model, at least the loss of mass of the mineral material is used to determine the amount of pollutants released during the firing of the mineral material.

The loss of mass of the mineral material makes it possible to determine the amount of pollutants that results from the firing of the binder that bond the mineral material, and it is notable that according to a feature of the invention, said determination of the amount of pollutants can be carried out in particular by taking account of the mass of the non-flammable compounds. It should be understood that the firing of the binder bonding the mineral material causes the release of flammable pollutants and non-flammable materials, such as, for example, the evaporation of a given amount of water. According to a feature of the invention, in the context of determining the amount of pollutants released during the firing of the bonded mineral material, the evaporation of non-flammable materials is not taken into account in the determination of the amount of pollutants released during the establishment of the predictive model. This amount of pollutants determined to obtain the predictive model takes into account only the release of compounds having flammable properties. In other words, the application of the predictive model makes it possible to determine the amount of flammable pollutants generated in each of the chambers of the oven by firing the sized mineral material.

Therefore, the predictive model is generated by creating a database of different parameters representative of the operation of the oven. In other words, the operating parameters of the furnace are varied in which the test is carried out, in particular the firing temperature, in order to determine the amount of pollutants that escapes from the binder bonding the mineral material under the effect of each of the established firing temperatures, so as to be able to consider, subsequently, that for a given operating temperature of the oven, the amount of pollutants will be known. In this way, and according to this example, a database of an amount of pollutants estimated according to an operating temperature of the oven for different types of binders is established, this database then being used in real time during the operation of the oven.

According to an optional feature of the invention, during a preliminary step prior to the first step, an effective temperature is measured in each of the chambers or sets of chambers.

The term "effective temperature" is understood to mean the temperature measured locally, that is to say in a chamber or a set of chambers, during the operation of the oven. The effective temperature measurement carried out during the preliminary step subsequently makes it possible to apply the predictive model, the latter correlating quantities of pollutants that escape from the binder bonding the mineral material as a function of the measured effective temperature as explained previously, by matching a firing temperature from the database with the measured effective temperature.

According to an optional feature of the invention, prior to the third step, a maximum ventilation flow rate value is determined in each of the chambers or assembly of chambers of the oven.

The maximum ventilation flow rate threshold value in each of the chambers corresponding to the maximum ventilation capacity that each of the chambers or set of chambers can provide. Each of the chambers of the oven has a capacity for discharging the flue gas and/or pollutants from said chamber, which can vary in particular according to the ventilation means which are associated with this chamber and depending on its position within the oven relative to extraction chimneys, and it is understood that according to this feature of the invention, independent control instructions can be applied to each of the chambers according to the maximum ventilation capacity that this chamber is likely to implement.

According to an optional feature of the invention, during an intermediate step, prior to the third step, an effective ventilation flow rate is measured in each of the chambers or sets of chambers, and the effective ventilation flow rate of each of the chambers or sets of chambers is compared with the minimum ventilation flow rate computed during the second step for the discharge of pollutants in said chambers or sets of chambers.

This comparison makes it possible to observe if the effective ventilation of the chamber or set of chambers is appropriate for the discharge of the amount of pollutants in the chamber determined during the first step.

According to an optional feature of the invention, during the third step, when the effective ventilation flow rate measured in one of the chambers or one of the sets of chambers is less than the minimum ventilation flow rate for the discharge of the pollutants in said chamber and that said minimum ventilation flow rate is less than the maximum ventilation flow rate value of said chamber, the extraction power of at least one common extraction chimney is increased to the whole of the oven and/or a suction module specific to said chamber or to said set of chambers.

It is understood that this third step can be implemented during the operation of the oven, this step consisting of increasing the ventilation flow rate of the common extraction chimneys to the whole of the oven and/or of the suction module specific to the chamber or to the set of chambers in order to lower the amount of pollutants in the chamber or set of chambers below the lower explosive limit.

According to an optional feature of the invention, during the third step, when the minimum ventilation flow rate is greater than the maximum ventilation flow rate threshold value of said chamber or of said set of chambers, the operation of the oven is stopped, and more particularly the movement of the conveyor and the circulation of the mat of mineral fibers within the oven, and at least one additional ventilation in the chamber or set of chambers is activated.

It is understood that the use of additional ventilation is necessary when the oven, and in particular the extraction chimneys, cannot provide sufficient ventilation for the discharge of the pollutants with respect to the maximum ventilation flow rate threshold value of the chamber or set of chambers, compared to the minimum ventilation flow rate which is strictly greater than said maximum ventilation flow rate value.

It is understood that, in a configuration where the effective ventilation flow rate measured in one of the chambers or set of chambers is at least equal to the minimum ventilation flow rate for the discharge of the pollutants and the latter is less than or equal to the maximum ventilation flow rate threshold value of the oven, the additional ventilation is not activated and the ventilation flow rate of the extraction chimneys is not increased.

It is also understood that, in a configuration where the effective ventilation flow rate measured in one of the chambers is greater than the minimum ventilation flow rate for the discharge of the pollutants from said chamber, the ventilation flow rate of at least one of the extraction chimneys can be reduced. This reduction is advantageously controlled, by extending it for as long as the amount of pollutants in the zone of the oven most concentrated in pollutants remains contained below a value corresponding to a percentage of the lower explosive limit of said zone, for example 40% of this lower explosive limit.

It is understood from what has been explained above that the ventilation method makes it possible to adjust the ventilation of the oven on a case-by-case basis, depending on the needs of each of the chambers or sets of chambers of the oven. In other words, it is possible to vary the ventilation of each of the chambers or sets of chambers independently, while ensuring that each of the chambers or sets of chambers is ventilated appropriately for discharging pollutants, and thus limiting the risks of explosion of the oven. It is thus advantageously possible to reduce the costs due to a ventilation of a flow rate that is much greater than the respective needs of each of the chambers or of each of the sets of chambers. This ensures a reduction in costs associated with the operation of the oven, as well as its service life.

According to an optional feature of the invention, during an additional step and prior to the second step, an amount of fluid likely to pass from one chamber to another chamber, or from one set of chambers to another set of chambers, is computed during the operation of the oven, the amount of fluid being taken into account in order to determine the amount of pollutants present in a chamber or a set of chambers during the first step.

The additional step can in particular be carried out by means of tracing via an inert gas, which may be helium. Such an inert gas tracing method consists of determining the fluid movements from one chamber to another of a specific gas, the concentration of which can be measured, for example helium, then deducing therefrom a generalization on the fluid movements of the pollutants between each of the chambers.

It is then understood that the amount of pollutants present for a chamber or set of chambers includes both the pollutants that are generated by the loss of mass of the mineral material when it is fired in said chamber and determined by the predictive model, and also the circulation of pollutants from a chamber adjacent to said chamber.

According to an optional feature of the invention, the steps of the method are carried out during the operation of the oven.

The invention further relates to an oven configured to form a mat of mineral fibers by firing a binder bonding a mineral material placed on a conveyor, the oven comprising, in series on the path of the conveyor, an inlet, a plurality of heating chambers and an outlet, the oven comprising at least one control unit configured to control the operation of each of the chambers according to the ventilation method as previously mentioned.

Each of the chambers of the oven can in particular comprise at least one suction module and a blowing module. The chambers blowing module makes it possible to blow flue gas, coming from a gas burner, into the chamber, and more specifically through the mineral fibers arranged on the conveyor, along a blowing direction substantially perpendicular to the longitudinal direction of the oven and to the direction of travel of the conveyor. Such a blowing of the flue gases makes it possible to activate the polymerization of the binder with the mineral fibers. The suction module subsequently makes it possible to suck said flue gas from the chamber in order to evacuate at least some of the flue gas to the burner to which the blowing module is connected. The chamber can thus mainly operate in a closed circuit. It should be noted that the invention aims to cover chambers, regardless of the type of heating, in which pollutants resulting from the polymerization of the binder are to be evacuated.

The blowing modules and the suction modules can be arranged in each of the chambers, such that the flue gas from each of the blowing modules pass through the mineral fibers in a single first blowing direction.

According to one alternative, it is possible to arrange the suction modules and the blowing modules in each of the chambers such that at least one of the blowing modules of one of the chambers projects the flue gas from the burner thereof in a second blowing direction, opposite the first blowing direction. The oven can then comprise the first chamber and the second chamber, the blowing modules of which project the flue gas in the first blowing direction, and the third chamber, the blowing module of which projects the flue gas through the mineral fibers in the second blowing direction. Such a configuration of the blowing modules makes it possible to optimize the polymerization of the mineral fibers with the binder by causing the flue gas to penetrate through the mineral fibers in two opposite directions.

According to an optional feature of the invention, each of the chambers of the plurality of chambers comprises at least one additional ventilation, the additional ventilation being controlled by the control unit according to the oven ventilation method.

The additional ventilation may in particular consist of complementary ventilation means of the oven which are added to the extraction chimneys and to the ventilation means, or fans, provided in the blowing or suction modules specific to each chamber. Having additional ventilation specific to each chamber of the oven makes it possible, under the control of the control unit, according to particular operating conditions of the oven, to achieve significant ventilation targeted to one or more chambers, temporarily during operation thereof, or only when the oven is stopped.

Other features, details and advantages of the invention will become more clearly apparent on reading the following description, and of several exemplary embodiments given by way of non-limiting example, with reference to the appended schematic drawings, in which:

FIG. 1 is a schematic view of an oven in which the oven ventilation method according to the invention is implemented;

FIG. 2 is a vertical cross-sectional view of the oven from FIG. 1;

FIG. 3 is a flowchart of the main steps of the oven ventilation method.

In the description detailed below, the ventilation method forming the subject matter of the invention will be described in relation to an oven in which the heating is carried out by gas burners, but it should be noted that other types of heating within the oven could be implemented without departing from the scope of the invention.

An oven 1, according to one aspect of the invention, is shown in FIG. 1. Said oven is configured to cure the binder arranged within and/or around a cluster of mineral fibers to glue them together, and may in particular be part of an installation for manufacturing mineral wool, in which it is necessary to carry out at least one step of firing a mineral material. More particularly, a mineral wool can be obtained by a succession of steps, including in particular a fiberizing step during which a binder is sprayed onto mineral fibers obtained beforehand by treatment of molten glass, and a step of firing the binder-fiber mixture thus obtained during the fiberizing step. During this step of firing the mixture, the passage through an oven makes it possible to activate the polymerization of the polymer forming a binder with the mineral fibers.

For this purpose, the oven 1 as shown schematically in FIG. 1 extends mainly in a main direction of extension, also called the longitudinal direction L of the oven 1, and comprises an inlet 2 and an outlet 4 each arranged at a longitudinal end of the oven 1, as well as a conveyor 6 on which the mineral fibers mixed with the binder are arranged. The conveyor 6 has the form of a conveyor belt able to support the mineral fibers and able to transport them through the oven 1 in a circulation direction D parallel to the longitudinal direction L of the oven 1. A plurality of heating chambers 8, respectively capable of heating the mineral fibers transported by the conveyor 6, is arranged on the path of the conveyor 6. The plurality of heating chambers 8 is arranged in series in the longitudinal direction L of the oven 1, such that the conveyor 6 successively passes through each of the heating chambers 8 of the oven 1.

Each of the heating chambers 8 comprises at least one blowing module 10 and a suction module 12 arranged on either side of the conveyor 6. The blowing module 10 is connected to a burner 14, visible in FIG. 2, the flue gases of which are transported, via intake ducts 22, in the direction of the heating chamber 8 into the blowing module 10. The suction module 12 subsequently makes it possible to suck in some of the flue gas from the heating chamber 8 in order to redistribute a portion thereof, via exhaust ducts 23, to the burner 14.

More specifically, the blowing module 10 projects the flue gas from the burner 14 through the mineral fibers arranged on the conveyor 6, along a blowing direction R parallel to a vertical direction V of the oven 1, itself perpendicular to the longitudinal direction L and a transverse direction T of the oven 1.

A first face 16 of the conveyor 6 corresponding to the face bearing the mineral fibers and a second face 18 corresponding to the face opposite the first face 16 in the vertical direction V of the oven 1 are both defined. A first blowing direction R1 of the flue gases is then defined by the blowing module 10, when said blowing module 10 is arranged facing the second face 18 of the conveyor 6 and the suction module 12 is facing the first face 16 of the conveyor 6.

A second blowing direction R2 of the flue gases is also defined by the blowing module 10, opposite the first blowing direction R1 in the vertical direction V of the oven 1, when the blowing module 10 is arranged facing the first face 16 of the conveyor 6 and the suction module 12 is arranged facing the second face 18 of the conveyor 6.

Either or both the blowing and/or suction modules comprises a main fan, associated with the chamber, which makes it possible to implement the desired flow direction and flow rate of the flue gases within a chamber.

According to the shown example of the invention, the oven 1 comprises three heating chambers 8, a first heating chamber 8a, a second heating chamber 8b and a third heating chamber 8c according to the preceding features and each comprising a blowing module 10 and a suction module 12 according to the features mentioned above. More particularly, the first chamber 8a and the second chamber 8b each have their blowing module 10 arranged such that the flue gases pass through the mineral fibers in the first blowing direction R1. The third chamber 8c has its blowing module 10 arranged in such a way that the flue gases pass through the mineral fibers in the second blowing direction R2.

Such an arrangement of the three heating chambers 8 of the oven 1 according to the shown example of the invention makes it possible to improve the polymerization of the mineral fibers circulating on the conveyor 6 by homogenizing the polymerization thereof on each of its faces, due to the alternating passage of the flue gases along the first blowing direction R1 and the second blowing direction R2.

Still according to the example shown, the first chamber 8*a* constitutes the chamber closest to the inlet 2 of the oven 1 and the third chamber 8*c* is the one closest to the outlet 4 of the oven 1. It is then understood that the second chamber 8*b* is arranged between the first chamber 8*a* and the third chamber 8*c* in the longitudinal direction L of the oven 1. At least one set of chambers formed by at least two chambers 8 is also defined successively along the conveyor 6 of the oven. For example, a first set of chambers can be formed from the first chamber 8*a* and from the second chamber 8*b*, while a second set of chambers can be formed by the second chamber 8*b* and the third chamber 8*c*.

At least one extraction chimney 20 is placed in the oven 1 in order to evacuate, outside the oven 1, a portion of the flue gases resulting from the heating of the mineral fibers and a portion of the outside air being infiltrated into the oven 1 at the inlet and outlet of the conveyor 6. According to the example of the invention shown, the oven 1 comprises a first extraction chimney 20*a* and a second extraction chimney 20*b*. The first extraction chimney 20*a* is arranged in line with the inlet 2 of the oven 1 in the vertical direction V of the oven 1, while the second extraction stack 20*b* is arranged in line with the outlet 4 of the oven 1 in the vertical direction V of the oven 1.

The oven 1 also comprises at least one additional ventilation unit 30. More specifically, each of the chambers 8 of the oven 1 comprises an additional ventilation unit 30, the operation of which is independent of one another. The first chamber 8*a* thus comprises an additional first ventilation 30*a*, the second chamber 8*b* comprises a second additional ventilation unit 30*b* and the third chamber 8*c* comprises an additional third ventilation vent 30*c*. It should be considered that during operation of the oven 1, the additional ventilation units 30 are not intended to be active continuously, these being activated during particular conditions of the oven 1 which will be explained later in the rest of the detailed description.

In the example shown, the additional ventilation unit 30 specific to each chamber 8 of the oven 1 consists of a fan separate from the main fan(s) provided in the blowing module 10 and/or in the suction module 12 for the circulation of the flue gases within the oven, and more particularly a fan arranged in the suction module.

It should however be noted that variants not shown can be implemented without departing from the context of the invention. More particularly, in one variant, the additional ventilation unit can consist of a fan arranged in the blowing module, it being understood that, in accordance with what has been mentioned above, this fan forming the additional ventilation unit is not actuated in a standard operating mode of the oven, but is implemented when specific conditions of the oven and in particular the pollutant-deficient discharge are observed. In this variant, according to what has been previously described, the additional ventilation is separate and independent from the main fan(s) provided in the blowing module 10 and/or in the suction module 12 for the circulation of the flue gases within the oven.

During operation of the oven 1, and in particular during the firing of the binder bonding the mineral material, flue gases comprising in part pollutants are produced. More specifically, under the effect of the heat released in each of the chambers 8, the binder bonding the mineral material releases, when fired, a certain amount of volatile compounds, such as pollutants or even water vapor. It should be understood here and in the rest of the description that the compounds having explosiveness properties are called pollutants.

In order to limit the risks of explosion from the oven 1 due to the release of pollutants when the binder bonding the mineral material is fired, the ventilation of the oven 1 is ensured at least by the extraction chimneys 20, the suction modules 12 adjoining the chambers 8, and optionally by the additional ventilation unit 30 of each of the chambers 8. In order for the ventilation of the oven to be effective and optimal, a control unit 40 of the oven 1 has at least the function of controlling the ventilation of said oven 1, that is, the operation of the extraction chimneys 20, the suction modules 12, and additional ventilation modules 30. More specifically, the control unit 40 is configured, in the oven 1 according to one aspect of the invention, to implement a method for ventilating the oven according to another aspect of the invention, which is particularly particular in that it takes into consideration a predictive model.

The predictive model integrated into the control unit 40 notably has the function of determining in real time during the operation of the oven 1, and independently in each of the chambers 8 or in each of the sets of chambers 8, the effective ventilation needs as a function of an amount of pollutants P present in each of the chambers 8 or set of chambers 8. This is the advantage of such a method for ventilating the oven 1, using the predictive model, in that it makes it possible to determine ventilation requirements independently in each of the chambers 8 or set of chambers 8, without requiring the stopping of the operation of the oven 1. In other words, the method makes it possible to switch from a ventilation determined for the oven 1 as a whole to individual ventilation for each of the chambers 8 or sets of chambers 8 in the oven 1. It is thus possible to limit the risks of explosion from the oven 1 while allowing energy saving during the operation thereof.

The method for ventilating the oven 1, incorporating the predictive model, will now be described in more detail.

This will begin by describing the construction of the predictive model integrated in the ventilation method of the oven 1, the purpose of that method being to determine the amount of pollutants released from the binder bonding the mineral material when it is fired in the oven.

To do so, during the creation of the predictive model, a step of measuring the loss of mass of the binder bonding the mineral material for several possible firing temperatures and for several types of binders that can be used to form a mat of mineral fibers by firing is carried out. It should be considered here that the temperature is a firing temperature of the mineral material used only during the creation of the predictive model.

During this loss of mass measurement step, a firing time of the mineral material as well as a firing temperature of the furnace representative of the oven, and more particularly a chamber of the oven, is first defined. Subsequently, the mineral material comprising the binder is weighed before its firing and then after its firing. In this way, a value of the loss of mass of the binder that bonds the mineral material for a given firing temperature and a given time is obtained. The operation is then repeated for different firing temperatures in order to obtain a database comprising the loss of mass of the binder bonding the mineral material as a function of a given temperature. Similar operations are carried out by varying the type of binder in order to obtain a database of the loss of mass of the binder as a function of its type, at given temperatures.

More particularly, the mineral material is weighed once all of the water has evaporated off from the analyzed sample. The value of the loss of mass of the binder bonding the mineral material for a given firing temperature and a given time as mentioned above by subtracting, from the mass difference between the weighing before and after firing, the moisture content of the sample which is known at the beginning of the creation of the predictive model.

It is understood that this loss of mass value of the binder bonding the mineral material then corresponds to the sum of the release of an amount of pollutants and a mass of volatile non-flammable compounds.

In the context of the invention, the predictive model is such that only the pollutants are taken into account, that is, compounds having flammable properties. In other words, it is intended to combine, at a given temperature, an amount of pollutants released during the firing, and more particularly present in the chamber of the oven, without taking into account the amount of volatile compounds that do not have flammable properties, such as water vapors, which could be released from the mineral material and the associated binder during firing.

To do this, it is assumed that the composition of the mass of the evaporated binder is the same as the composition of the binder mixture that is present before firing. By way of example, when the binder is composed of 30% of a first compound A, at 20% of a second compound B and at 50% of a third compound C, the distribution of the components in the mass of the evaporated binder is the same, namely 30% of the first compound A, 20% of the second compound B. and 50% of the third compound C.

Once this determination has been made, looking only at the flammable compounds, a database is thus obtained which plays a role in forming the predictive model and which makes it possible to associate quantities of pollutants P that escape from the binder bonding the mineral material and are likely to be present in a chamber or a set of chambers, as a function of a plurality of temperatures and a plurality of types of binders.

The predictive model thus created is integrated into the control unit of the oven 1. According to the invention, the control unit is able to implement the predictive model to optimize the ventilation of the oven as a function of the operating features thereof, according to a ventilation method which will now be described with reference to FIG. 3.

A first step 100 of the method for ventilating the oven 1 consists of applying the predictive model during the operation of the oven 1. In other words, the amount of pollutants P present in each of at least two chambers 8, here the first chamber 8a and the second chamber 8b or each of two sets of chambers 8 of the oven 1, is determined on the basis of the predictive model. It should be considered that in the rest of the description, only the embodiments implementing two chambers 8 of the oven 1 will be described, but that the features of the method apply mutatis mutandis to two sets of chambers 8 or more and to all of the chambers 8 of the oven 1.

In order to implement the first step 100 of the ventilation method, a reading of an effective temperature Tp present in each of the two chambers 8 of the oven 1 is carried out. It is understood that the effective temperature Tp is the temperature measured inside a chamber during the operation of the oven 1. A first effective temperature Tp1 for the first chamber 8a and a second effective temperature Tp2 for the second chamber 8b are then obtained. The database of the predictive model is then used, integrated into the control unit, to determine the amount of pollutants P in each of the first chamber 8a and the second chamber 8b as a function, respectively, of the first effective temperature Tp1 and the second effective temperature Tp2 measured and of the type of binder used during the operation of the oven 1. A first amount of pollutants P1 which escapes from the binder bonding the mineral material in the first chamber 8a and a second amount of pollutants P2 which escapes from the binder bonding the mineral material in the second chamber 8b are then obtained.

During an additional step 110 of the method for ventilating the oven 1, following the first step 100, an amount Q of fluid capable of passing from one chamber 8 to another within the oven 1 is considered. It is in fact known that, during the operation of the oven 1, fluid leaks can come from one chamber 8 to the other, having the effect of increasing or decreasing the amount of pollutants P in one of the chambers 8. In this particular embodiment, in which the additional step 110 is provided after the first step, the control unit is parameterized to consider this amount Q of fluid which passes from the second chamber 8b to the first chamber 8a and vice versa in order to determine the amount of pollutants P present in both of the first chamber 8a and the second chamber 8b.

According to one example of the invention, the amount Q of fluid which passes from one chamber 8 to another is determined by means of an inert gas tracing, which may be helium. It should be considered that the determination of the amount Q of fluid is carried out during the adjustment of the oven, that is, prior to its operation. The inert gas tracing results are subsequently integrated into the control unit.

During the tracing by inert gas, helium is injected at least in the first chamber 8a and the second chamber 8b successively, in order to follow the fluid movements between them. Following the injection of the inert gas into the first chamber 8a, concentration measurements of said inert gas are carried out in the first chamber 8a and in the second chamber 8b as well as in each of the extraction chimneys 20 of the oven 1. In the same way, following the injection of inert gas into the second chamber 8b, the inert gas concentrations in the first chamber 8a and in the second chamber 8b, as well as in each of the extraction chimneys 20 of the oven 1, are measured. Measuring the inert gas concentration in each of the extraction chimneys 20 makes it possible in particular to observe the inert gas leaks outside the oven 1.

Following these injections and these inert gas concentration readings, a total mass flow rate of gas circulating between each of the two chambers 8 is computed. This calculation of the total mass flow rate of gas subsequently makes it possible to determine a first amount Q1 of fluid which passes from the second chamber 8b to the first chamber 8a and a second amount Q2 of fluid which passes from the first chamber 8a to the second chamber 8b.

Thus, the first amount of pollutants P1 of the first chamber 8a comprises on the one hand the amount of pollutants P present in the first chamber 8a and resulting from the firing of the binder bonding the mineral material, this amount being determined by the predictive model, and comprises on the other hand the first amount Q1 of fluid which passes at least from the second chamber 8b to the first chamber 8a and which is determined by inert gas tracing. It is also understood that helium tracing makes it possible to determine an amount of fluid that potentially passes from the third chamber 8c to the first chamber 8a.

Likewise, the second amount of pollutants P2 of the second chamber 8b comprises on the one hand the amount of pollutants P present in the second chamber 8b and resulting from the firing of the binder bonding the mineral material, this amount being determined by the predictive model, and comprises on the other hand the second amount Q2 of fluid which passes from the first chamber 8a to the second chamber 8b and which is determined by inert gas tracing. It is also understood that helium tracing makes it possible to determine an amount of fluid that potentially passes from the third chamber 8c to the second chamber 8b.

A second step 200 of the method consists of computing a minimum ventilation flow rate Vmin for the discharge of the amount of pollutants P in each of the two chambers 8, the minimum ventilation flow rate Vmin being the minimum value of air flow to be circulated in the chamber below which it is not possible to ensure the correct ventilation of the chamber 8 according to the status parameters of the chamber, and in particular the effective temperature therein. More specifically, a first minimum ventilation flow rate Vmin1 is computed for the discharge of the first amount of pollutants P1 in the first chamber 8a and a second minimum ventilation flow rate Vmin2 for the discharge of the second amount of pollutants P2 of the second chamber 8b, by considering a lower explosive limit set for each of said chambers 8a, 8b.

The lower explosive limit corresponds to a maximum value above which an amount of pollutants P1, P2 in the first chamber 8a and the second chamber 8b can generate an explosion. More precisely, the lower explosive limit corresponds to a concentration, in $g/m^3$, maximum pollutants that may be present in the first chamber 8a and the second chamber 8b, before this concentration generates an explosion within the oven 1. This lower explosive limit is then set for an effective temperature or an effective temperature range of the oven 1. A first lower explosive limit is defined for the first chamber 8a calculated according to its first effective temperature Tp1 and a second lower explosive limit for the second chamber 8b calculated according to its second effective temperature Tp2.

It is then understood that the control unit determines the first minimum ventilation flow rate Vmin1 for the first chamber 8a so that the first amount of pollutants P1 does not exceed the first lower explosive limit. Likewise, the control unit determines the second minimum ventilation flow rate Vmin2 for the second chamber 8b so that the second amount of pollutant P2 does not exceed the second lower explosive limit. Thus, the variation of the ventilation flow rate in each of the chambers 8 makes it possible to improve the ventilation in each of the chambers 8 and therefore to improve its ventilation in order to evacuate the pollutants toward the neighboring chambers 8 and/or to the extraction chimneys, thus making it possible to reduce the amount of pollutants present in each of the chambers 8.

It should be considered that during the operation of the oven 1, the effective temperature Tp is not fixed, and that the latter can vary over time during the firing of the binder bonding the mineral material. Similarly, the amount of pollutants P varies as a function of time, as it is dependent on the measured effective temperature Tp during the operation of the oven 1.

At this stage of the method, the predictive model, and in certain cases the parameterization of the control unit with the air circulation data from one chamber to another obtained by the inert gas tracing method, have made it possible to determine the amount of pollutants P1, P2 present in both the first chamber 8a and the second chamber 8b and the minimum ventilation flow rate Vmin1, Vmin2 necessary for each of the two chambers 8, during operation of the oven 1.

It should be considered at this stage that before the operation of the oven, a maximum ventilation flow rate threshold value S, which each of the chambers 8 of the oven 1 can provide, is determined. In other words, the maximum ventilation capacity is determined that the suction modules 12 of each of the chambers 8 and the extraction chimneys 20 can generate in each of the chambers 8. More specifically, a first maximum ventilation flow rate threshold value S1 of the first chamber 8a is determined, taking into account the ventilation performed by the suction module 12 specific to it and the impact of the suction of the extraction chimneys 20 on the first chamber 8a. Likewise, a second maximum ventilation flow rate threshold value S2 of the second chamber 8b is determined, taking into account the ventilation performed by the suction module 12 specific to it and the impact of the suction of the extraction chimneys 20 on the second chamber 8b.

It should be considered that the impact of the suction of the extraction chimneys 20 can vary from one chamber 8 to the other of the oven 1, in particular as a function of the position of the chamber 8 within said oven 1. In the example shown, the first chamber 8a being closest to the inlet 2 of the oven 1 and therefore to the first extraction chimney 20a, the impact of the suction of the first extraction chimney 20a will be greater on the first chamber 8a than on the second chamber 8b that is farther from said first extraction chimney 20a. More generally, the ventilation flow rate threshold values determined for chambers close to the extraction chimneys, whether at the inlet or at the outlet, are higher than the ventilation flow rate threshold values determined for chambers arranged substantially in the center of the oven. In the example shown, the first threshold value S1 of the first chamber 8a is greater than the second threshold value S2 of the second chamber 8b.

During an intermediate step 250 of the method, carried out in the example shown in FIG. 3, following the second step, but which could be carried out in parallel, it is determined by measuring, within the oven 1, an effective ventilation flow rate in each of the chambers 8. More precisely, a first effective ventilation flow rate and a second effective ventilation flow rate are measured respectively within the first chamber 8a and the second chamber 8b. The term "effective ventilation flow rate" is understood to mean the flow rate of air circulating in each of the chambers which is measured during the operation of the oven 1.

Once the first effective ventilation flow rate and the second effective ventilation flow rate are measured in the first chamber 8b and the second chamber 8b, these two values are compared respectively to the first minimum ventilation flow rate Vmin1 and to the second minimum ventilation flow rate Vmin2 calculated previously during the second step 200 of the method. It is then verified that the effective ventilation flow rate of the first chamber 8a and of the second chamber 8b is sufficient for the discharge of the amount of pollutants P1, P2 present in each of said chambers 8 and therefore at least equal to the first minimum ventilation flow rate Vmin1 and to the second minimum ventilation flow rate Vmin2.

Hereinafter, a step of comparing 260 the effective ventilation flow rates measured in each of the chambers 8 with the minimum ventilation flow rates Vmin for the discharge of the pollutants P in each of said chambers 8 and also with the maximum ventilation flow rate threshold values S of each of the chambers 8 is carried out.

Depending on the results of these comparisons, a third step is implemented to perform or not perform corrective actions on the ventilation of the oven.

During the third step, in a first configuration of the oven 310, the effective ventilation flow rate measured in one of the chambers 8 can be at least equal to the minimum ventilation flow rate Vmin for the discharge of the pollutants P, the latter being less than or equal to the maximum ventilation threshold value S of the chamber 8. In this first configuration, the additional ventilation unit 30 is not activated and the ventilation flow rate of the extraction chimneys 20 is not increased. It is therefore understood that here, the operation of the oven is not modified and is not interrupted.

In other words, considering by way of example the first chamber, when the first effective ventilation flow rate measured in the first chamber 8a is at least equal to the first minimum ventilation flow rate Vmin1 for the discharge of the first amount of pollutants P1 and said first minimum ventilation flow rate Vmin1 is less than or equal to the first threshold value S1 of maximum ventilation flow rate of said first chamber 8a, the control unit 40 does not order the activation of the first additional ventilation unit 30a or the increase in the ventilation flow rate of the extraction chimneys 20. Indeed, in such a configuration, the first amount of pollutants P1 present in the first chamber 8a does not have an explosion risk and the effective ventilation of the first chamber 8a is sufficient to keep this amount of pollutants below the lower explosive limit.

Still during the third step, in a second configuration 320 of the oven 1, when the effective ventilation flow rate measured in a chamber 8 is greater than the minimum ventilation flow rate Vmin of the corresponding chamber by more than a defined value, for example equal to 30% of the minimum ventilation flow rate, the control unit 40 generates a first specific control instruction 321 for reducing the extraction flow rate of at least the first extraction duct 20a and/or the second extraction duct 20b and/or the suction module 12 of the corresponding chamber 8.

The advantage of such a first control instruction 321 is that it enables a reduction in the energy consumption of the operation of the oven 1 while retaining optimal safety compared to the risks of explosion of the oven 1 due to the pollutants which escapes from the binder bonding the mineral material during its firing.

It should be noted that this reduction in the extraction flow rate can be conditioned to the fact that the chamber or the set of chambers in which the amount of pollutants is the most concentrated has a concentration of pollutants less than 40% of the lower explosive limit LEL.

According to a third configuration of the oven 330, when the effective ventilation flow measured in a chamber 8 is less than the minimum ventilation flow rate Vmin for the discharge of the amount of pollutants P in said chamber 8 and said minimum ventilation flow rate Vmin is less than the threshold value S of maximum ventilation flow rate of the chamber 8, the control unit 40 generates a second specific control instruction 331 for the chamber 8, namely an increase in the ventilation power of one and/or the other of the extraction chimneys 20 and/or of the suction module 12 of said chamber 8.

It is then understood that this second specific control instruction 331 makes it possible to adjust the ventilation of the oven 1, independently from one chamber to another, so that it is optimal for the discharge of pollutants in each of the chambers, here of the first chamber 8a. With regard to the calculation specific to the first chamber 8a, that chamber does not cause any modification to the ventilation of the other chambers 8 of the oven 1 during this second specific control instruction 331, as that ventilation is directed only to the first chamber 8a. It should be understood that during this third step, the calculation is made independently for each chamber, so that the optimal discharge of the first amount of pollutants P1 in the first chamber 8a can then be carried out with a ventilation flow rate calculated independently with respect to the ventilation flow rate calculated for the neighboring chamber, that is the second chamber 8b, and the optimal discharge of the pollutants present in that neighboring chamber.

Thus, it is possible to optimize the ventilation of each of the chambers 8 on a case-by-case basis, during the operation of the oven 1, in order to optimize safety as to the oven's 1 risks of explosion.

According to a fourth configuration of the oven 340, during the third step of the method, when the minimum ventilation flow rate Vmin for the discharge of the amount of pollutants P calculated for the chamber 8 is greater than the threshold value S of maximum ventilation flow rate of the chamber 8, the control unit 40 generates a third specific control instruction 341 which, on the one hand, temporarily stops the operation of the oven 1 and on the other hand activates the additional ventilation unit 30 of the chamber 8.

It is understood that this third specific control instruction 341 is generated when the oven 1 is not able to ensure sufficient ventilation during operation thereof to evacuate the amount of pollutants P at one of the chambers 8. In this context, and even if the other chambers are able to evacuate the amount of pollutants that are specific thereto, it is necessary to stop the operation of the oven in order to prevent a first explosion from taking place in the chamber. Having access, according to the invention, via the predictive model and where appropriate the determination of the quantities of fluid exchanged from one chamber to another, to a determination of the pollutants present which is independent for each chamber, makes it possible to avoid considering the oven as a whole. In particular, this makes it possible to prevent quantities of pollutants present in chambers close to the extraction chimneys, that is chambers with low amounts of pollutants, from weighting large amounts of pollutants present in chambers arranged in the center of the oven.

The stoppage of the oven continues until the operation of the additional ventilation unit 30 and the suction module 12 of the chamber 8 in which a risk of explosion has been detected, as well as the operation of the extraction chimneys 20, restore a concentration of pollutants in the corresponding chamber 8 which is less than the previously determined lower explosive limit. Subsequently, the control unit 40 commands the resumption of the operation of the oven 1 while continuing to control the ventilation of said oven 1 according to the ventilation method described above. It is understood that the ventilation method as has just been described for one of the chambers 8 applies mutatis mutandis to all of the chambers 8 of the oven or sets of chambers of the oven 1.

It is thus understood that the ventilation method of the oven 1 is implemented continuously during the operation of the oven and that one or other of the specific controls of the third step can be applied by the control unit several times and successively during the firing of the binder bonding the mineral material.

The invention therefore clearly achieves the goal set for it, while optimizing the ventilation of the oven by distinguishing the ventilation needs of each of the chambers of the oven by means of a predictive model determined upstream and allowing the ventilation method to be applied continuously during the operation of the oven if compliance with the lower exposure limits allows it.

Of course, the invention is not limited to the examples that have just been described, and numerous modifications can be made to these examples, without departing from the scope of the invention.

The invention claimed is:

1. A method for ventilating an oven configured to form a mat of mineral fibers by firing a binder bonding a mineral material placed on a conveyor, the oven comprising, in series on a path of the conveyor, an inlet, a plurality of heating chambers and an outlet, the ventilation method comprising at least the implementation, by a control unit of the oven, of a plurality of successive steps that comprise:
- a first step of determining by computing, chamber by chamber or set of chambers by set of chambers, an amount of pollutants present in at least two chambers or two sets of chambers of the oven, said first step implementing a comparison of features of a current operation of the oven with a predictive model defined upstream and implemented in the control unit of the oven,
- a second step of determining by computing a minimum ventilation flow rate for a discharge of the amount of pollutants in each of the two chambers or of the two sets of chambers, and
- a third step of generating an independent control instruction intended for each of the chambers, or of each of the sets of chambers, for specific ventilation of each chamber or of each set of chambers as a function of the minimum ventilation flow rate calculated previously specifically for each of the chambers or set of chambers.

2. The method for ventilating an oven according to claim 1, comprising at least one step of constructing the predictive model implemented in the control unit.

3. The method for ventilating an oven according to claim 2, wherein, during the step of constructing the predictive model, at least one loss of mass of the mineral material is determined as a function of a firing temperature.

4. The method for ventilating an oven according to claim 3, wherein, during the step of constructing the predictive model, at least the loss of mass of the mineral material is used to determine the amount of pollutants released during the firing of the mineral material.

5. The method for ventilating an oven according to claim 1, wherein during a preliminary step prior to the first step, an effective temperature in each of the chambers or sets of chambers is measured.

6. The method for ventilating an oven according to claim 1, wherein prior to the third step, a maximum ventilation flow rate threshold value is determined in each of the chambers or set of chambers of the oven.

7. The method for ventilating an oven according to claim 6, wherein during the third step, when the minimum ventilation flow rate is greater than the maximum ventilation flow rate threshold value of said chamber or of said set of chambers, operation of the oven is stopped and at least one additional ventilation is activated in the chamber or set of chambers.

8. The method for ventilating an oven according to claim 1, wherein during an intermediate step, prior to the third step, an effective ventilation flow rate is measured in each of the chambers or sets of chambers, and the effective ventilation flow rate of each of the chambers or sets of chambers is compared with the minimum ventilation flow rate determined during the second step for the discharge of the pollutants from said chambers or sets of chambers.

9. The method for ventilating an oven according to claim 8, wherein prior to the third step, a maximum ventilation flow rate threshold value is determined in each of the chambers or set of chambers of the oven, and wherein during the third step, when the effective ventilation flow rate measured in one of the chambers or one of the sets of chambers is less than the minimum ventilation flow rate for the discharge of the pollutants in said chamber and that said minimum ventilation flow rate is less than the maximum ventilation flow rate threshold value of said chamber or of said set of chambers, an extraction power of at least one extraction chimney that is shared by the whole of the oven and/or of a suction module specific to said chamber or to said set of chambers is increased.

10. The method for ventilating an oven according to claim 1, further comprising, prior to the second step, an additional step during which an amount of fluid likely to pass from one chamber to another chamber, or from one set of chambers to another set of chambers, is computed during operation of the oven, the amount of fluid being taken into account in order to determine the amount of pollutants present in a chamber or a set of chambers during the first step.

11. The method for ventilating an oven according to claim 1, wherein the plurality of successive steps of the method are carried out during operation of the oven.

12. An oven configured to form a mat of mineral fibers by firing a binder bonding a mineral material placed on a conveyor, the oven comprising, in series on the path of the conveyor, an inlet, a plurality of heating chambers and an outlet, the oven comprising at least one control unit configured to control operation of each of the chambers.

13. The oven according to claim 12, wherein each of the chambers of the plurality of chambers comprises at least one additional ventilation unit, the additional ventilation unit being controlled by the control unit according to the method for ventilating the oven.

* * * * *